United States Patent
Ying et al.

(10) Patent No.: US 8,094,405 B1
(45) Date of Patent: Jan. 10, 2012

(54) REPETITIVE ERROR CORRECTION METHOD FOR DISK-DRIVE SERVO CONTROL SYSTEMS

(75) Inventors: Edward Ying, Berkeley, CA (US); Pantas Sutardja, Los Gatos, CA (US); Man Cheung, Campbell, CA (US)

(73) Assignee: Marvell International Ltd., Hamilton (BB)

( * ) Notice: Subject to any disclaimer, the term of this patent is extended or adjusted under 35 U.S.C. 154(b) by 292 days.

(21) Appl. No.: 12/258,351

(22) Filed: Oct. 24, 2008

Related U.S. Application Data

(60) Provisional application No. 60/982,286, filed on Oct. 24, 2007.

(51) Int. Cl.
*G11B 5/596* (2006.01)

(52) U.S. Cl. .................................................. 360/77.04

(58) Field of Classification Search ..................... None
See application file for complete search history.

(56) References Cited

U.S. PATENT DOCUMENTS

| | | | | |
|---|---|---|---|---|
| 5,896,353 | A | 4/1999 | Naohara | |
| 5,978,169 | A | 11/1999 | Woods | |
| 6,141,175 | A * | 10/2000 | Nazarian et al. | 360/77.04 |
| 6,411,461 | B1 * | 6/2002 | Szita | 360/77.04 |
| 6,437,936 | B1 | 8/2002 | Chen et al. | |
| 6,574,067 | B2 | 6/2003 | Chen et al. | |
| 6,751,046 | B1 | 6/2004 | Szita et al. | |
| 6,754,025 | B1 | 6/2004 | Shepherd et al. | |
| 6,775,091 | B1 | 8/2004 | Sutardja | |
| 6,847,503 | B2 | 1/2005 | Zhang et al. | |
| 6,947,233 | B2 | 9/2005 | Toda | |
| 6,950,273 | B2 * | 9/2005 | Nakagawa et al. | 360/78.14 |
| 6,956,711 | B2 | 10/2005 | Hanson et al. | |
| 7,016,140 | B1 | 3/2006 | Schultz et al. | |
| 7,019,926 | B2 | 3/2006 | Chainer et al. | |
| 7,088,547 | B1 * | 8/2006 | Wang et al. | 360/77.04 |
| 7,106,547 | B1 * | 9/2006 | Hargarten et al. | 360/77.04 |
| 7,209,312 | B1 | 4/2007 | Sutardja | |
| 7,265,933 | B1 | 9/2007 | Phan et al. | |
| 7,319,570 | B2 * | 1/2008 | Jia et al. | 360/77.02 |
| 7,378,810 | B1 | 5/2008 | Sutardja et al. | |
| 7,489,469 | B2 * | 2/2009 | Sun et al. | 360/77.04 |
| 7,508,618 | B1 | 3/2009 | Herbst et al. | |
| 7,564,644 | B2 * | 7/2009 | Kim et al. | 360/78.14 |
| 7,573,214 | B1 | 8/2009 | Sutardja et al. | |
| 7,656,605 | B1 * | 2/2010 | Sutardja | 360/77.04 |
| 2006/0098330 | A1 | 5/2006 | Takaishi | |

OTHER PUBLICATIONS

Ying, Edward et al., "Repetitive Error Correction Method for Disk-Drive Spindle Motor Control Systems", U.S. Appl. No. 12/192,979, filed Aug. 15, 2008, to be published by the USPTO, 57 pages.

Sutardja, Pantas, "Methods for Repeatable Run-Out Compensation," U.S. Appl. No. 11/471,174, filed Jun. 19, 2006, to be published by the USPTO, 47 pages.

(Continued)

*Primary Examiner* — Hoa T Nguyen
*Assistant Examiner* — James L Habermehl

(57) ABSTRACT

Methods, systems and computer program products for compensating repeatable run-out (RRO) are described. In some implementations, RRO may be compensated by predicting the RRO and subsequently subtracting the predicted RRO from the actual value of the RRO to cancel out the undesired effect caused by the RRO during operation. More specifically, RRO generated at each spindle motor rotation may be predicted by measuring the position errors associated with the RRO with respect to a current position of a read/write head. A computational model then may be utilized to determine one or more correction factors to compensate for the RRO.

28 Claims, 9 Drawing Sheets

OTHER PUBLICATIONS

Office Action mailed Feb. 20, 2008 in U.S. Appl. No. 11/471,174, filed Jun. 19, 2006, to be published by the USPTO, 9 pages.

Office Action mailed Sep. 9, 2008 in U.S. Appl. No. 11/471,174, filed Jun. 19, 2006, to be published by the USPTO, 9 pages.

* cited by examiner

REPETITIVE ERROR CORRECTION METHOD FOR DISK-DRIVE SERVO CONTROL SYSTEMS

CROSS-REFERENCE TO RELATED APPLICATIONS

This application claims priority to U.S. Provisional Application Ser. No. 60/982,286 titled "REPETITIVE ERROR CORRECTION METHOD FOR DISK-DRIVE SERVO CONTROL SYSTEMS," filed on Oct. 24, 2007, the disclosure of which is incorporated herein by reference in its entirety.

TECHNICAL FIELD

The subject matter of this application is generally related to servo systems.

BACKGROUND

Some data storage systems, such as disk drive systems, use a voice coil motor (VCM) to position the head actuator arm relative to the rotational media for reading and writing to the storage regions. A disk drive data storage system typically includes one or more disks or platters for storing information, and the spindle motor may be used to rotate the platters. Subsequently, a read/write head may read information from or write information to the storage regions on the platters.

In order to accurately position the read/write head with respect to a storage region on a disk, variations in the position error between head and the servo data tracks written on the platters are kept at a minimum during operation.

However, external forces or disturbances often exist in the disk drive system that can interfere with position control of the VCM. One such disturbance is the repeatable run-out (RRO). RRO is an error signal that is repeated with each rotation of the disk. Because the effects of RRO are generally non-correctable, RRO can severely impact the overall performance of a disk drive system.

SUMMARY

Methods, systems and computer program products for compensating repeatable run-out (RRO) are described. In some implementations, RRO may be compensated by predicting the RRO and subsequently subtracting the predicted RRO from the actual value of the RRO to cancel out the undesired effect caused by the RRO during operation. More specifically, RRO generated at each spindle motor rotation may be predicted by measuring the position errors associated with the RRO with respect to a current position of a read/write head. A computational model then may be utilized to determine one or more correction factors to compensate for the RRO.

In some implementations, a method includes: receiving a command associated with a servo head; predicting a first position parameter based on the command; receiving a second position parameter; predicting a position error based on the first position parameter and the second position parameter; determining a correction factor based on the predicted position error; and outputting a signal to control the servo head based on the correction factor.

In some implementations, a method includes: receiving one or more parameters for driving a servo head; constructing a model function based on the received parameters; predicting a position error using the model function; generating a correction factor from the predicted position error; and compensating the servo head based on the correction factor.

In some implementations, a system or apparatus includes: a correction module to generate a correction signal that compensates position errors of a servo head; a servo controller to output a control signal based on the compensated position errors; and a voice coil module to control the servo head to follow a target servo track in response to the control signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Hard Disk Drive System Overview

Figure 1A:
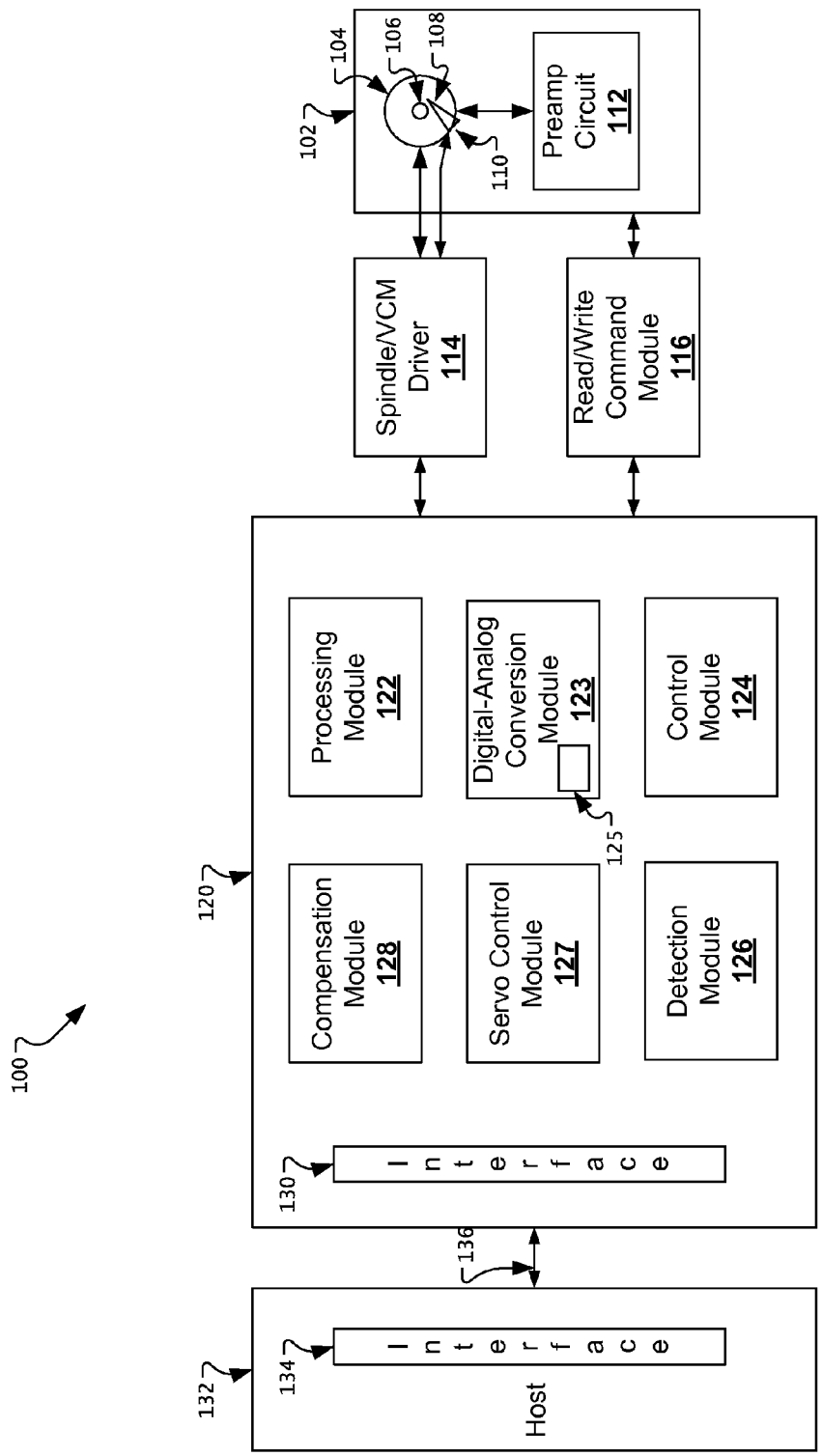
FIGS. 1A and 1B show an example hard disk drive (HDD) system.
Figure 1B:
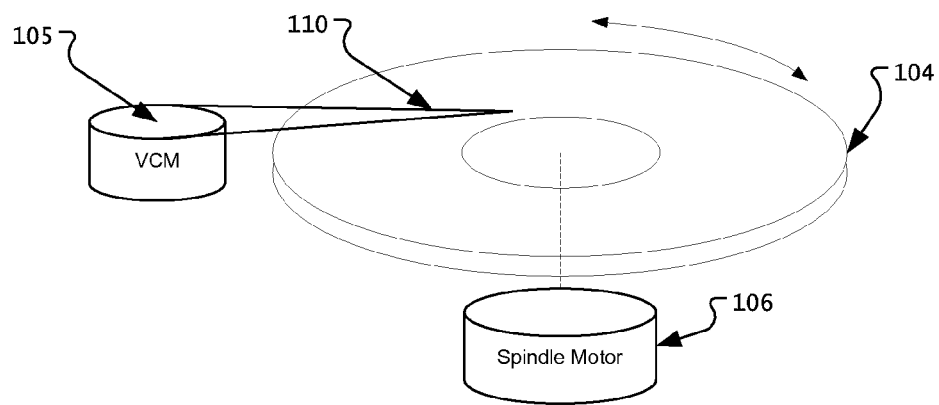

FIGS. 1A and 1B show an example hard disk drive (HDD) system 100. The HDD system 100 includes a head assembly 102 including one or more platters 104, a voice coil motor (VCM) 105, a spindle motor 106, a read/write head 108, an actuator arm 110, a pre-amp circuit 112, a spindle/VCM driver 114, a read/write command module 116 and a printed circuit board (PCB) 120.

Signals between the head assembly 102 and the PCB 120 can be carried, for example, through a flexible printed cable. The head assembly 102 may include one or more magnetic disks or platters 104 for storing magnetic data. The platters 104 may be rotated by the spindle motor 106. The spindle motor 106 may rotate the platters 104 at a controlled speed during the read/write operations. The read/write actuator arm 110 may move relative to the platters 104 in order to read and/or write data to/from the platters 104. The spindle/VCM driver 114 may be configured to control the spindle motor 106, which rotates the platters 104. If desired, the spindle/VCM driver 114 also may generate control signals for positioning the read/write actuator arm 110 using the voice coil motor 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the platters 104.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the platters 104. Typically, the write current changes polarity upon each change in the binary value of the write data signal.

The PCB 120 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, other data such as non-volatile control code. The control data and control code may include instructions the processing module 122 executes or utilizes as well as tables, parameters or arguments used during the execution of these instructions. In some implementations, the processing module 122 also may store various firmware routines for controlling the operation of the spindle motor 106 such as, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use. The spindle/VCM driver 114 may receive VCM control signals from the PWM controller and generate a corresponding command signal to command the VCM 105 for positioning the actuator arm 110 and the read/write head 108, for example, as part of a parking operation. The VCM 105 may be controlled by the servo control module 127, and may be configured to apply torque to the actuator arm 110 so as to swing the read/write head 108 during, for example, a track-seeking operation and to maintain the read/write head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin rate of the spindle motor. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide information associated with the zero crossing signal to the processing module 122, for example, to compute the velocity of the spindle motor 106.

The control module 124 may function to manage and handle data transfer between the PCB 120 and a host 132 during read and write operations through the communications interfaces 130/134, which may be connected through a bus 136. The control module 124 also may include servo logic for managing the positioning of the read/write head 108 when seeking (e.g., moving from one track to a non-adjacent track) and during tracking (e.g., staying on a single track).

The control module 124 may communicate with the communications interface (e.g., an input/output interface) 130 and with the spindle/VCM driver 114 or the read/write command module 116. The control module 124 may coordinate control of the spindle/VCM driver 114, the read/write command module 116, the processing module 122, the detection module 126 and the compensation module 128.

The control module 124 may receive a command from the host 132 to generate a spin-up command while the spindle motor 106 is at rest to begin the spin-up mode of operation. The processing module 122 may receive the spin-up command from the control module 124 and retrieve an associated control routine for the spin-up mode of operation from a memory unit.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and/or similar algorithms to allow for the verification of the integrity of the data that is written. During read operations, the read/write head 108 may generate read signals (e.g., analog signals), and the read/write command module 116 may convert the analog read signals into digital read signals. The converted signals may be detected and decoded by conventional techniques to recover data written by the read/write head 108.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

In some implementations, the spindle motor 106 may be constructed as a multi-phase motor. For example, the spindle motor 106 may be constructed as a brushless three-phase inductive motor. The three-phase motor may be constructed with a rotating magnet assembly (or spindle) and a stationary coil assembly (or stator). An alternating current may be supplied to the coils of the stator, and the spindle may be rotated by a force created by the alternating current.

The spindle motor 106 may include stationary elements (e.g., the stator) and rotatable elements (e.g., a rotor). The rotor may include a hub that supports each platter. The spindle motor 106 may include a bearing arrangement such as one or more sets of ball bearings so that the rotor may rotate about the stator. The stator may include electromechanical stator components including a stator core having core members that radiate away from the center of the core (or centertap) to define stator poles of the stator, and a set of stator wires (or windings) that are wound around the stator poles and interconnected in a predetermined configuration (e.g., a "Y" configuration). The rotor may include a set of permanent magnets that are arranged to define rotor poles of the rotor.

During operation, the rotation of the rotor causes each disk to spin (e.g., in either a forward-spin or reverse-spin direction). To accelerate the rotor to a normal operating spin rate and subsequently maintain the spin rate substantially constant, applied torque may be generated to overcome stiction and to oppose dynamic frictional forces. To generate the applied torque, current may be applied to one or more of the windings to generate a stator magnetic field. The magnitude of the electromagnetic field may vary and may depend upon the magnitude of the current flow. Similarly, the permanent magnets in the rotor may produce a rotor magnetic field. Various degrees of torque can be produced when the stator magnetic field and the rotor magnetic field interact.

As discussed above, the spindle motor 106 may be implemented as a three-phase motor. In implementations in which a three-phase motor is used, a current may be supplied to two of the three windings of the three-phase motor by applying a voltage between the terminals associated with the two windings and the centertap. The third terminal may be left floating such that the voltage seen on the third terminal is the voltage (e.g., a sinusoidal voltage) induced by the movement of the rotating magnets relative to the windings. Of course, other modes are possible. For example, current may flow through only a single winding between one of the winding terminals and the centertap, while no current flows through either of the other two windings. As another example, current may flow through all three of the windings. Generally, a spin-up process may be performed by applying, for example, a DC voltage across a selected combination of the windings to generate a positive torque on the rotor to accelerate the spindle motor 106 to an operating spin rate.

Given the three terminals and two polarities of current direction for each winding terminal, the current may be supplied to the windings in six different states. The spindle motor 106 may be driven by sequencing through these six states repeatedly. For example, the spindle motor 106 may cycle from one state (e.g., where terminal "A" is driven by a high voltage and terminal "B" is allowed to float) to another state (e.g., where terminal "A" is now floating while terminal "B" is now driven by a high voltage).

In some implementations, a power supply voltage may be applied to the spindle motor 106 to induce the BEMF on one of the windings by the rotating permanent magnet of the rotor. In these implementations, the motor supply voltage may be a pulse-width modulated three-phase pulsed signal.

In some implementations, BEMF signals may be used for controlling the acceleration of the spindle motor 106 up to a desired operating spin rate. Specifically, by detecting the BEMF signals, the motor speed of the spindle motor 106 may be accurately identified. The detected motor speed can subsequently be used to determine whether a steady-state operational speed has been reached and whether the motor spin-up process is complete. For example, the BEMF signals of the spindle motor 106 may be monitored by the detection module 126 and processed by the control module 124 to generate velocity feedback information (e.g., digital signals indicative of motor speed). Using the velocity feedback information, a corresponding motor speed may be identified. If the identified speed does not meet a predetermined threshold, as will be discussed in greater detail below, a motor voltage signal may be generated for controlling the voltage of the spindle motor 106, which modifies the speed and spin-up time of the spindle motor 106.

In some implementations, for a system having "P" windings and "Q" permanent magnet poles in the rotor, there may be (P*Q) BEMF signal attributes that may be used for spindle motor control. In these implementations, BEMF signal attributes that may be used for speed control may include zero crossings of the BEMF signals. Of course, other signal attributes also may be used.

Information may be stored on each platter 104 in concentric tracks. Data tracks may be divided into sectors. Information may be written to and/or read from a storage surface(s) of a platter 104 by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed. The read/write head 108 may access different sectors within each track on the platter 104.

Operation of the actuator arm 110 may be controlled by the servo control module 127. The servo control module 127 may move the read/write head 108 according to two primary operations: seek control operation and track following operation.

In a seek control operation, the servo control module 127 controls the actuator arm 110 such that the read/write head 108 may be transitioned from an initial position to a target track position, which the host 132 has requested. A seek control operation generally includes accelerating, decelerating and settling the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the read/write head 108 to rest over a target track within a selected settle threshold or window, which may be based on a percentage of the track width from the center of the track. The servo control module 127 may employ, for example, a pre-loaded algorithm, to ensure that the read/write head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the read/write head 108 is settled over a desired track, the servo control module 127 may initiate a track following mode. In the track following mode, the read/write head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which includes a digital-analog converter 125, can operate to convert data between the digital form used by the PCB 120 and the analog form conducted through the read/write head 108 in the head assembly 102. As discussed above, the read/write command module 116 may encode data to be written by the read/write head 108 and generate encoded write signals. These encoded write signals, in some implementations, may be in digital format (e.g., as received from the host 132), and subsequently be converted to analog signal for controlling the read/write head 108. In implementations in which the read/write command module 116 provides error correction coding (ECC) to write signals, ECC may be applied prior to converting the corrected signals into analog format. Similarly, signals read by the read/write head 108 may be converted into digital format prior to applying ECC to the read signals.

In some implementations, the head assembly 102 can provide servo position information read by the read/write head 108 to the servo control module 127. Servo sectors on each of the platters 104 can include a sync field (e.g., used for locking servo timing loop clock phase and frequency to a given servo pattern), head location information, such as a track identification field and data block address (e.g., used for identifying a target track and data block), and burst fields (e.g., used for providing servo fine location information). The head location information read by the read/write head 108 may be converted from analog signals to digital data by the digital-analog converter 125, and fed to the servo control module 127. The servo positional information can be used to detect the location of the read/write head 108 in relation to a target track or target data sectors on the platters 104. The servo control module 127 may utilize, for example, target data sectors and servo position information to precisely place the read/write head 108 over the target track and data sector on the platters 104, and to continuously maintain the read/write head 108 aligned with the target track while data is written/read to/from one or more identified data sectors.

The digital-analog conversion module 123 may include a digital-analog converter (DAC) 125 for converting control signals (e.g., for controlling the position of the read/write head 108) generated by the control module 124 into analog signals (and from analog signals into digital data). For example, a head position signal may be generated by the control module 124 and provided to the DAC 125. The DAC 125 then may convert the head position signal into an analog signal (e.g., a voltage signal) for driving the VCM 105 coupled to the actuator arm 110. The actuator arm 110 may subsequently move the read/write head 108 along the surface of the platters 104 based on the analog signal provided by the DAC 125.

In some implementations, the DAC 125 may be configured to output, for example, different analog voltage ranges to account for resolution needs at different operating conditions. In these implementations, the DAC 125 may have one or more selectable modes. For example, the DAC 125 may utilize certain modes (e.g., referred to here as "higher modes") to provide a larger voltage range and bigger current scale but at a lower resolution (volts/digital count). In these implementations, higher modes may be used, for example, during seeking control operations where a large voltage range is generally desirable. Conversely, the DAC 125 may employ other modes (e.g., referred to here as "lower modes") to provide a higher resolution (e.g., smaller voltage steps per digital count). Lower modes may be used, for example, for tracking following operations where high resolution is critical to servo tracking performance.

As discussed above, servo sectors may include location or position information for identifying the location of the read/write head 108 in relation to a target track or target data sectors on the platters 104. The position information from the servo sectors may be decoded and fed to the servo control module 127 to generate a current command signal to the VCM 105 that allows the read/write head 108 to track follow each servo sector track.

Generally, track following accuracy may be determined by the bandwidth (BW) of the servo control loop. For example, large bandwidth can yield high track following accuracy. However, infinite bandwidth control is unrealizable. As such, imperfect accuracy necessarily results. In some instances, the imperfect accuracy may be contributed by non-zero position errors (PES) between the absolute head position and a written servo track. In other instances, the imperfect accuracy may be contributed by non-repetitive and repetitive noise sources. These non-repetitive and repetitive noise sources can corrupt the written servo tracks and the information embedded therein. Such non-repetitive and repetitive noise sources also may appear in the PES albeit at lower amplitude levels.

Figure 2:
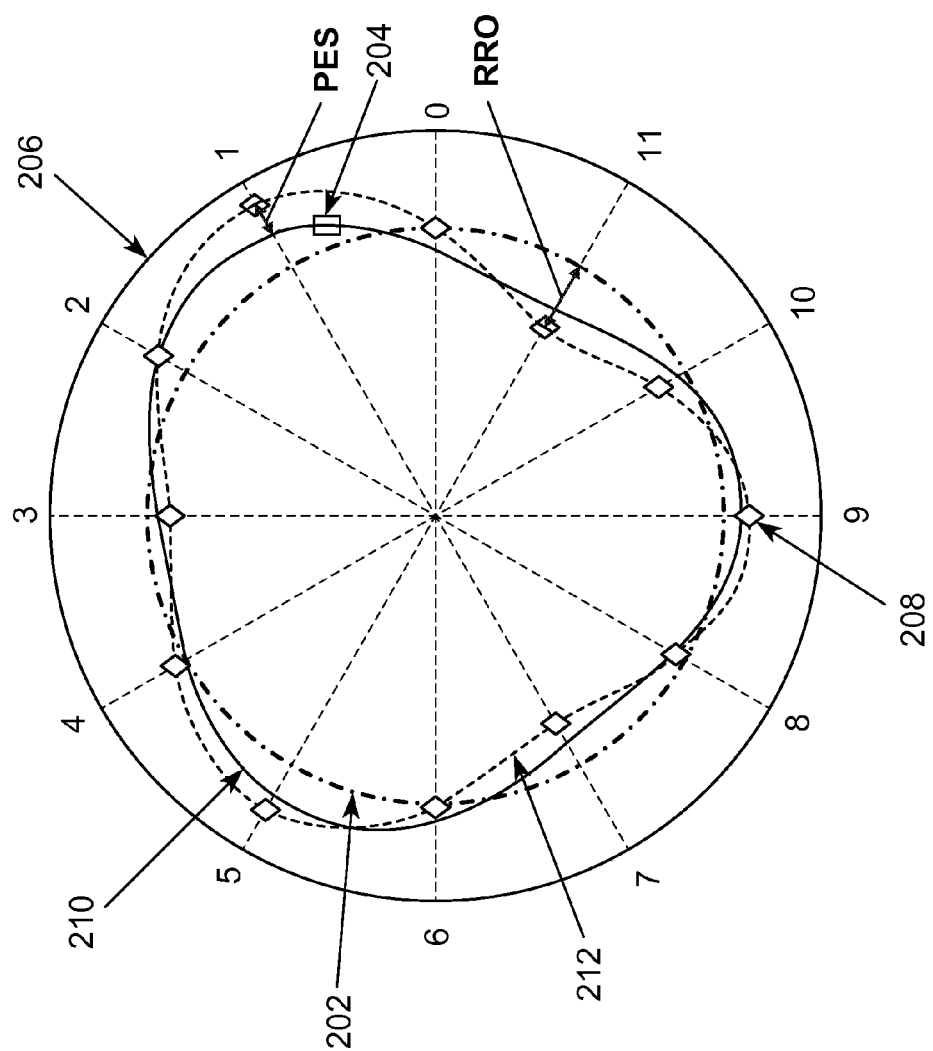
FIG. 2 shows the effects of repeatable run-out on a written pattern.

Non-repetitive noise sources may include non-repeatable run-out (NRRO). NRRO also may be caused by SPM vibration, disk resonance modes, air-flow disturbances and other externalities. NRRO may be non-synchronous with respect to the spindle motor (SPM) rotation. By contrast, repetitive noise sources are synchronous to SPM rotation, and may repeat with each SPM rotation. Repetitive noise sources may include repeatable run-out (RRO). RRO may be caused by imbalance or synchronous nature of the SPM vibration. RRO also may be caused by synchronous or non-synchronous disturbances during a servo-track-write process, causing written-in radial errors in the servo sectors. FIG. 2 shows the effects of RRO on a written pattern.

Referring to FIG. 2, a disk 206 includes a plurality of servo sectors 208 each being identified by a sector number (e.g., "0", "1", . . . "11"). As shown, an ideal track centerline 202 is to be followed by the read/write head 204 during a self-servo-write (SSW) process. Ideally, the read/write head 204 follows the track centerline 202 for writing servo sectors 208. Due to non-repetitive and repetitive noise sources, the read/write head 204 may deviate from the centerline 202. In the example shown, the read/write head 204 deviates from the centerline 202 and tracks along path 210. In cases where the repetitive noise sources include RRO, the read/write head 204 may write servo sectors along the RRO profile line 212. In this example, the PES may be represented by a radial difference between the RRO profile line 212 and the path 210, and the value of the RRO may be represented by a difference between the RRO profile line 212 and the ideal track centerline 202.

Because errors associated with RRO are generally non-correctable (e.g., as servo sectors have already been written), RRO can cause write-to-write track squeeze that limits the HDD track densities. Specifically, RRO can cause self-servo-write sectors to be written with repetitive radial position errors, which limits the track density capability that a SSW process may allow, thus degrading the overall accuracy of the SSW process.

To reduce or remove errors associated with RRO, an adaptive least-mean-squares (LMS) filtering technique may be used to compensate for the harmonics generated by RRO. In these implementations, the LMS filtering technique may generate a feed-forward command to select one or more harmonics in the RRO profile and cause the position of the read/write head 204 to follow the one or more harmonics in the RRO profile. The LMS filtering technique may adapt to time-varying changes in RRO to ensure that every possible variation of the RRO is considered while implementing the LMS filtering technique.

The LMS filtering technique, however, can consume a long processing time. Specifically, the execution time and the robustness of the LMS filtering technique can adversely limit the number of harmonics that can be selected. Further, this technique also may amplify other non-selected harmonics that can cause the read/write head 108 to deviate from the intended harmonics.

Another technique to reduce or remove errors associated with RRO, a discrete convolution process may be performed. The discrete convolution process may be performed off-line in a self-test process. Specifically, the discrete convolution can generate a servo sensitivity function model, and discretely convolve PES impulse response of the model to generate RRO correction value (RCV) corresponding to each servo sector on every track. For example, RCV may be written to and read from a servo sector in one or more short data fields following the main servo sector field identifying the servo sector. In general, referring again to FIG. 2, RCV can approximate the actual RRO and thus may be subtracted from the PES before being fed to the servo control module 127. In these implementations, because RRO is taken into account, the read/write head 108 may be re-positioned on the ideal track centerline.

While the discrete convolution process generates correction values to predict and compensate for the RRO that may occur during a SSW process, the discrete convolution process generally cannot adapt to post-self-test variations in RRO. Additionally, the traditional discrete convolution process does not consider low frequency modeling errors, and hence, cannot estimate errors associated with low frequency harmonics.

To address such issues, in some implementations, a repetitive error correction (REC) process that iteratively calibrates and cancels radial RRO disturbances may be implemented. The REC process may allow the read/write head 108 to follow a substantially concentric track located at the mean centerline. Specifically, the servo control module 127 may utilize data generated by the REC process to precisely place the read/write head 108 over a target track and servo sector, and to continuously maintain the read/write head 108 aligned with the target track while data is being written/read to/from a desired servo sector. By aligning (or re-aligning) the read/write head 108 over (or substantially near) the mean centerline (e.g., centerline 202), track accuracy may be improved so as to increase the overall track density and to avoid the possibility of overlapping servo data between adjacent tracks that can give rise to severe drive errors.

The REC process also may be applied other applications, such as, without limitation, tracking following on spiral and concentric servo sectors during a self-servo-write process, track following servo data on concentric servo sectors during normal drive operation, generating RRO correction values in a self-test process for writing to RRO fields in a servo sector, and characterizing RRO in a HDD manufacturing environment.

In some implementations, the RRO may be compensated by predicting the RRO and subsequently subtracting the predicted RRO from the actual value so that the disturbances may be properly accounted for. More specifically, the source RRO generated at each SPM rotation may be predicted by measuring the position errors (PES) associated with the source RRO with respect to the position of the read/write head 108. In some implementations, the corrected position errors (CPES) may be determined using a computational model that utilizes corrected parameters from a prior revolution (e.g., position errors (PES) that have been corrected from a previous SPM rotation) to compensate for the current source RRO. In some implementations, the computation model also may receive a DAC command in addition to the corrected parameters collected from a prior revolution to output a REC feed-forward command ($U_{REC}$) that is subsequently used to derive the corrected position errors (CPES) for a current revolution. In some implementations, the DAC command may be an output value calculated from a compensation filter. The DAC command, in these implementations, may be fed to the DAC 125 which outputs a voltage signal to the spindle/VCM power driver 114 for controlling the spindle motor 106.

Figure 3:
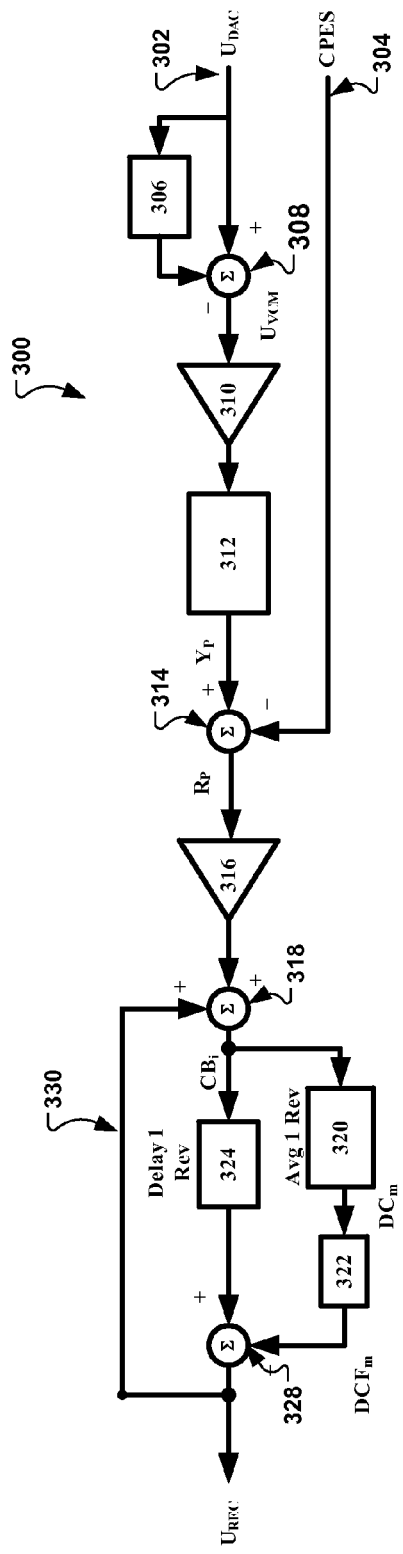
FIG. 3 shows an example block diagram of a repetitive error correction module for determining a repetitive error correction feed-forward command ($U_{REC}$).

In some implementations, the performance of the REC process may depend on accurate model parameters in order that an accurate prediction of the actual RRO may be obtained. The REC feed-forward command ($U_{REC}$) may be determined by a REC module (e.g., REC module 300 shown in FIG. 3), which predicts and provides an estimate of the RRO. The REC feed-forward command ($U_{REC}$), in some implementations, may be calculated at each revolution. The predicted/estimated RRO may then be used to cancel the effect of the actual RRO. FIG. 3 shows an example block diagram of a REC module 300 for determining a REC feed-forward command ($U_{REC}$).

As shown in FIG. 3, the REC module 300 may receive a DAC command ($U_{DAC}$) 302 including a corrected PES (CPES) 304 as input. Temporarily referring to FIG. 4, the DAC command ($U_{DAC}$) may be an output of the servo control module 404 which may be formed as a part of a REC control loop. The DAC command ($U_{DAC}$) may be fed to a DAC 406, and in response, the DAC 406 may output an analog signal (e.g., a voltage signal) to a VCM module 408 (or VCM mechanics, combined with an actuator arm and VCM driver) that allows the read/write head 108 to follow a target servo track.

In some implementations, the DAC may include one or more sub-DACs. For example, the DAC 406 may include a SPM DAC and a VCM DAC. In this example, the SPM DAC may be used to control motions of the spindle motor 106, and the VCM DAC may be used to control head motions via the voice coil motor 106. More specifically, the DAC command ($U_{DAC}$) 302 may be generated (e.g., by VCM or head position control algorithm), which then may be fed to the VCM DAC.

Referring back to FIG. 3, the DAC command ($U_{AC}$) 302 generated by the servo control module 404, in some implementations, may be given as a function with respect to the servo control module 404 [1]:

$$U_{DAC}(k)=\text{SVOCON}\{CPES(k)\} \quad [1]$$

where "k" represents a servo control interval and SVOCON{·} represents a control function applied by the servo control module 404.

The DAC command ($U_{DAC}$) 302 may be applied as an input to an averaging module 306 to determine an average value of the DAC command ($U_{DAC}$) 302. Specifically, the averaging module 306 may be used to calculate a revolution average of delay after each revolution in order to determine a DC bias component associated with the DAC command ($U_{DAC}$) 302.

In some implementations, the output of the REC module may be unbiased (e.g., to provide a zero mean) to prevent any bias offset from being imparted to the head position. To do so, the input to the REC module 402 (as will be discussed in greater detail with respect to FIG. 4) may have its DC bias component removed before being processed by the REC module 402. In some implementations, the DC bias component may be removed by subtracting the output of the averaging module 306 from the DAC command ($U_{DAC}$) 302 through the combiner 308. The output of the combiner 308, which represents the DAC command ($U_{DAC}$) 302 without the DC component, is fed to a gain module 310.

A computational model which predicts the dynamic behavior of the VCM module 408 may be utilized to estimate the RRO. While accurate model parameters (e.g., as developed by the VCM model 312) may provide an accurate prediction of RRO with respect to, for example, a low frequency range, gain mismatch between the VCM model 312 and hardware, if not considered, can degrade the overall REC performance. In certain instances, a large gain mismatch may even destabilize the servo system. Gain mismatch also may occur in cases where the gain of the VCM model 312 determined, for example, from electro-mechanical design parameters (e.g., torque factor, inertia and the like) may be different than the actual VCM hardware system gain (e.g., those associated with the VCM module 408), the difference of which may be evident across the entire frequency spectrum (e.g., and especially at low-to-zero frequency). Hence, an appropriate gain that closely models the HDD system 100 can improve the REC performance with respect to the speed of convergence and accuracy. Thus, in some implementations, the output of the combiner 308 may be used as an input plant parameter to the VCM model 312, and the gain module 310 may apply a suitable gain to the input plant parameter prior to forwarding the input plant parameter to the VCM model 312.

In some implementations, the gain applied by the gain module 310 may include an equalization gain ($K_{VCM}$) that can be calibrated for optimizing the performance of the REC process and to equalize (or match) the behavior between the computational model and the actual VCM module 312. In some implementations, the equalization gain ($K_{VCM}$) may be determined using a frequency response process. In a frequency response process, a transfer function gain of the VCM model 312 (as will be discussed in greater detail below) at a single frequency may be measured, and the measured gain may then be compared to a pre-calculated gain of the VCM model 312 at a same frequency.

In some implementations, to determine the pre-calculated gain, the behavior of the VCM 105 may be modeled as a pure inertia, as may be given by [2]:

$$G_{VCM}(s) \frac{vcmModGain}{s^2} \quad [2]$$

where "s" represents a continuous-time Laplace operator and vcmModGain represents a VCM model gain).

Based on the modeled behavior, the pre-calculated gain of the VCM model 312 may be determined from VCM parameters design values, as may be give by [3]:

$$vcmCalGain = \frac{K_T \cdot R_h \cdot TPM}{J \cdot (2\pi \cdot Fcal)^2} \quad [3]$$

where "vcmCalGain" represents a VCM calibration gain (tracks/amp); "$K_T$" represents a VCM torque factor (N-m/amp); "J" represents a VCM rotational inertia (kg-m$^2$); "$R_h$" represents a VCM pivot-to-head distance (meter); "TPM" represents a servo track density (tracks/meter); and "$F_{cal}$" represents a calibration frequency (Hz).

In implementations, where an infinite impulse response (IIR) filter is used to model the VCM 105, the "vcmCalGain" parameter may be determined by calculating the frequency response magnitude of the IIR filter with respect to the calibration frequency "$F_{cal}$".

A ratio may be determined between the measured gain and the pre-calculated gain. Based on the ratio, the equalization gain ($K_{VCM}$) of the gain module 310 may be set and applied to the output of the combiner 306 as an input gain factor to the VCM model 312.

Alternatively, the equalization gain ($K_{VCM}$) may be determined using an error statistical process. In the error statistical process, the equalization gain ($K_{VCM}$) may be swept within a given gain range while measuring and calculating the variation of the position errors (PES) as a metric. For example, the variation of the position errors (PES) may be measured using, for example, variance, standard deviation or root-mean-square statistical techniques. In some implementations, the variation of the position errors (PES) may be monitored on a periodic or continuous basis until which a minimum position error variation has been observed. Subsequently, the gain corresponding to the minimum position error variation may be captured and applied as the optimal equalization gain ($K_{VCM}$).

In some implementations, the frequency response process and the error statistical process may be implemented as an online calibration routine while the HDD system 100 is in operation that continuously (or periodically) calibrates the equalization gain ($K_{VCM}$) of the gain module 310 to ensure that the VCM model 312 is optimal throughout the REC process.

With the equalization gain ($K_{VCM}$) determined, a VCM input plant parameter $U_{VCM}(k)$ may be given as [4]:

$$U_{VCM}(k)=K_{VCM} \cdot (U_{DAC}(k)-\text{AvgDAC}_m) \quad [4]$$

where AvgDAC$_m$ represents an average DC bias component of the DAC command ($U_{DAC}$) 302 calculated from one revolution average of the DAC command ($U_{DAC}$) 302.

In some implementations, the average DC bias component AvgDAC$_m$ may be calculated once per revolution, as may be given by [5]:

$$AvgDAC_m = \frac{1}{N}\sum_{i=1}^{N} U_{DAC}(k-i) \quad [5]$$

where "N" represents a number of servo sector or control samples per revolution, "k" is a control interval (e.g., k=N, 2N, 3N, 4N, etc.), and "m" represents a revolution number defined by the value obtained from rounding (e.g., nearest zero) the result of "k" divided by "N". In essence, the average DC bias component $AvgDAC_m$ may indicate an average of "N" samples of the of the DAC command ($U_{DAC}$) 302 for a previous revolution.

Where the DC bias component of the DAC command ($U_{DAC}$) 302 calculated from one revolution average is zero, the equalization gain ($K_{VCM}$) may be set to one as default value, indicating that the DAC command ($U_{DAC}$) 302 is substantially the same as the VCM input plant parameter $U_{VCM}$ (k).

The VCM input plant parameter ($U_{VCM}$) may be fed to the VCM model 312. The VCM model 312, in some implementations, may be developed using a VCM plant transfer function $G_{VCM}(z)$ that may be used to predict a head position parameter ($Y_p$) of the read/write head 108. In these implementations, the relationship between the predicted head position parameter ($Y_p$), the VCM plant transfer function $G_{VCM}(z)$ associated with the VCM model 312 and the VCM input plant parameter ($U_{VCM}$) may be given as [6]:

$$Y_p(k) = G_{VCM}(z) \cdot U_{VCM}(k) \quad [6]$$

In some implementations, the VCM model 312 may be developed off-line using Bode data measured from various HDD systems as well as averaged Bode data based on such measurements. Bode data, in some implementations, may be obtained by measuring the transfer function or frequency response function (FRF) of the VCM system. The FRF may be determined via swept-sine or random noise measurement. For example, with respect to swept-sine measurement, a sinusoidal stimulus may be injected into the control loop and swept from low to high frequencies while measuring the FRF between the VCM current and the head position. As another example, with respect to random noise measurement, a broadband noise stimulus may be injected and the FRF may be determined via fast fourier transform calculations.

Because RRO can develop at low frequency, the VCM model 312, in some implementations, may apply model parameters that accurately model RRO (e.g., accurate model gain) at low frequency to the VCM input plant parameter ($U_{VCM}$) to counter the effect of RRO at low frequency.

In some implementations, the VCM model 312 may utilize an $n^{th}$-order digital IIR filter fitted to mechanical Bode data to aid in determining the predicted head position parameter ($Y_p$). Specifically, using a $n^{th}$-order digital IIR filter fitted to mechanical Bode data, the VCM plant transfer function $G_{VCM}(z)$ may be enhanced that aids in providing an accurate prediction of the head position parameter ($Y_p$). In some implementations, a 3rd-order digital IIR filter may be used to provide a VCM plant transfer function $G_{VCM}(z)$ as may be given as [7]:

$$G_{VCM}(z) = \frac{Y_P(z)}{U_{VCM}(z)} = \frac{b_0 + b_1 z^{-1} + b_2 z^{-2} + b_3 z^{-3}}{1 + a_1 z^{-1} + a_2 z^{-2} + a_3 z^{-3}} \quad [7]$$

In these implementations, a $3^{rd}$-order digital IIR filter may yield a VCM plant transfer function $G_{VCM}(z)$ that provides a low frequency plant complex pole. The low frequency plant complex pole, in some implementations, may be used to guard against integrator drift that may incur while the head position parameter ($Y_p$) is being determined.

Once the predicted head position parameter ($Y_p$) has been determined, the corrected PES (CPES) may be subtracted from the predicted head position parameter ($Y_p$) may be combined using the combiner 314 to determine a predicted RRO ($R_P$), as may be given as [8]:

$$R_P(k) = Y_p(k) - CPES(k) \quad [8]$$

In some implementations, the corrected PES (CPES) may be determined based on the position errors (PES) and the REC feed-forward command ($U_{REC}$) (e.g., $CPES(k) = PES(k) + U_{REC}(k)$). In these implementations, since the REC feed-forward command ($U_{REC}$) may be generated from information from a prior revolution and PES(k) may be determined from current data, the corrected PES (CPES), in essence, may be determined based on information from both the prior revolution and the current data.

The predicted RRO ($R_P$) may be fed as an input to a gain stage 316. In some implementations, the gain stage 316 may be associated with a REC convergence gain ($K_{REC}$) that may be regularly or periodically updated. In some implementations, the REC convergence gain ($K_{REC}$) may be a programmable gain that governs the convergence rate and stability of a REC algorithm. In some implementations, the REC convergence gain ($K_{REC}$) may be determined by tuning so as to achieve a proper balance between fast convergence and noise sensitivity of the REC algorithm.

In some implementations, the REC convergence gain ($K_{REC}$) may be set to be a constant value while the convergence process is in progress. In other implementations, the REC convergence gain ($K_{REC}$) may be set at zero (e.g., when the adaptation is to be halted) or to a larger or smaller value (e.g., when a faster or slower convergence is desired). In some cases, noise sensitivity may increase with the magnitude of the REC convergence gain ($K_{REC}$). If the REC convergence gain ($K_{REC}$) is too large, instability may result (e.g., the forward command-based repetitive error correction ($FF_{REC}$) may diverge from optimal values. Thus, in some implementations, the REC convergence gain ($K_{REC}$) may be tuned to achieve a desired balance between convergence rate and noise sensitivity.

In some implementations, the REC convergence gain ($K_{REC}$) may be defined as [9]:

$$K_{REC} < 1 \quad [9]$$

In some implementations, the REC convergence gain ($K_{REC}$) may be set between $\frac{1}{16}$ and $\frac{1}{4}$. In general, the REC convergence gain ($K_{REC}$) may be adjusted to strike a balance between convergence and stability. If desired, the REC convergence gain ($K_{REC}$) also may be fine tuned to further reduce noise sensitivity and to protect the REC module 300 against potential measurement errors.

In some implementations, the output of the gain stage 316 may be summed with the output of the REC module 300, the result of which may be processed by a delay operator 324. In these implementations, the delay operator 324 may implement a delay that delays the output of the combiner 318 by one revolution. The output of the combiner 318 may be delayed by one revolution because a repetitive disturbance (e.g., source RRO) generally includes components which repeat every revolution such that a correction signal that repeats every revolution may be used to cancel out these undesired components at each revolution. Therefore, in order to generate a repeatable correction signal, the delay operator 324 may impose a one-revolution delay.

The input to the delay operator 324, in some implementations, may be a circular buffer parameter $CB_i$ as may be defined as [10]:

$$CB_i(k) = U_{REC}(k) + K_{REC} \cdot R_p(k) \quad [10]$$

where "i" represents the servo sector number.

In these implementations, the REC feed-forward command ($U_{REC}(k)$) in equation [10] may be determined from equation [15] as will be discussed below. Thus the delay operator 324 may apply an N sample or one revolution delay to the circular buffer parameter $CB_i$. More specifically, at sample "k", the REC feed-forward command ($U_{REC}(k)$) may first be determined and applied by reading from the circular buffer parameter $CB_i$ and using equation [15] such that the REC feed-forward command ($U_{REC}(k)$) may include information from the (k−N) sample (or prior revolution). Then, the circular buffer parameter $CB_i$ may be updated using equation [10]. Specifically, the output from the delay operator 324 may be the circular buffer parameter $CB_i(k)$ delayed by N samples.

In some implementations, the parameter "i" may be defined as [11]:

$$i = k \bmod N \quad [11]$$

where "N" represents a number of servo sector samples per revolution.

In some implementations, an "M" revolution delay (e.g., where M>1) may be used if the disturbances include components which repeat every "M" revolutions. In such a case, the delay operator 324 may be modified to apply a delay of M*N samples and the circular buffer used for storing circular buffer parameters may be adjusted to include M*N buffer entries. In these implementations, the delay operator 324 may be used to generate the correction buffer entries in the circular buffer. The circular buffer may be a table of N entries where each entry may correspond to, for example, a servo sector index number, and may be updated every sample (e.g. $i^{th}$ entry of the circular buffer provides CB, (=k modulo N) that may be updated with data from control sample k).

Figure 5:
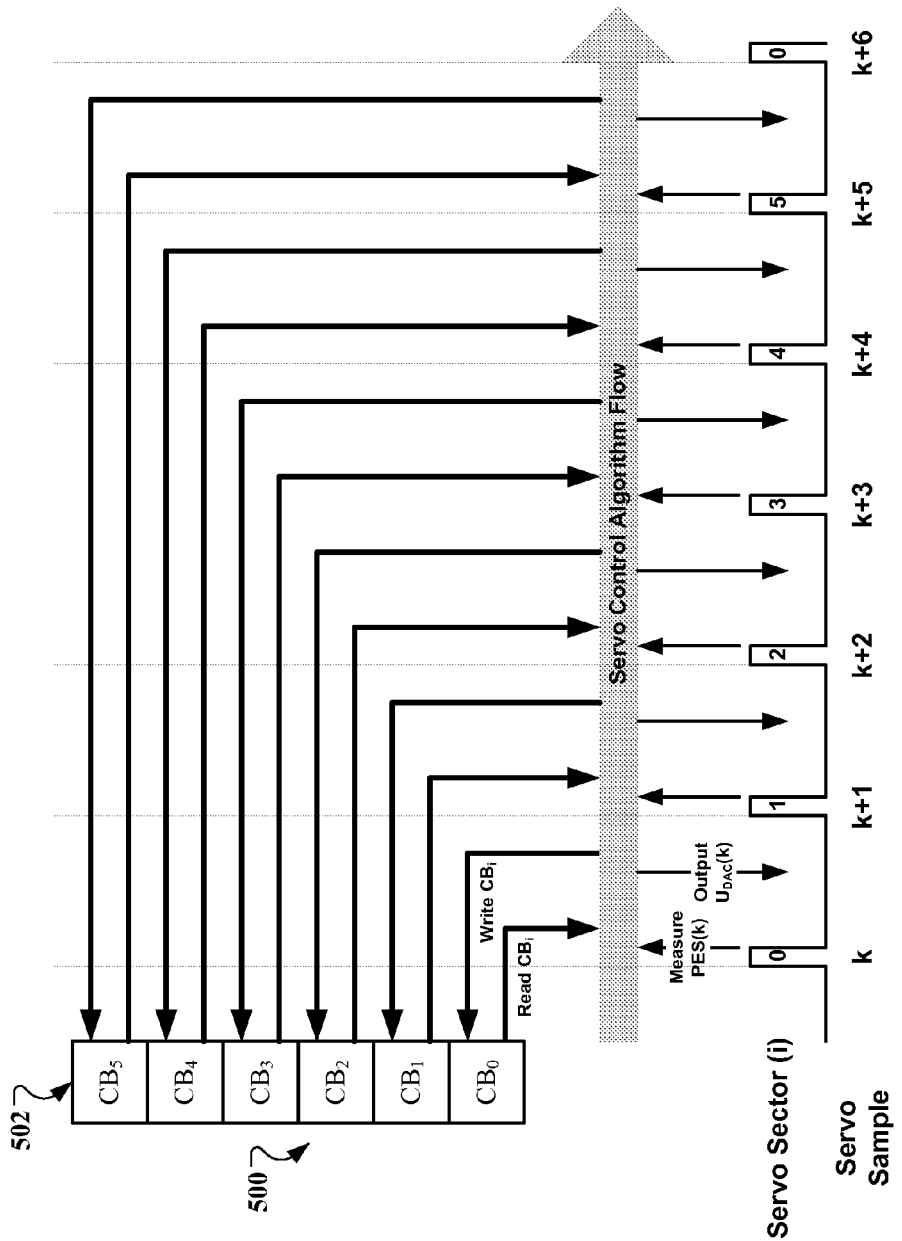
FIG. 5 shows an example circular buffer.

In some implementations, the circular buffer may be progressively updated at every revolution. The circular buffer may store one or more REC feed-forward command ($U_{REC}$) each corresponding to a particular position error measurement at a particular servo sector that can be used to output a suitable DAC command ($U_{DAC}$) to cancel out source RRO at the servo sector. Additionally, the circular buffer may function as a periodic signal generator that persistently outputs a repetitive signal even when, for example, inputs are disabled to cancel out the RRO effect at each revolution. FIG. 5 shows an example circular buffer 500.

Temporarily referring to FIG. 5, the circular buffer 500 includes six sub-circular buffers 502. In some implementations, each sub-circular buffer 502 may store a parameter used for determining the value of the REC feed-forward command ($U_{REC}$) to be applied in a next revolution. In some implementations, each sub-circular buffer 502 may store a sum of REC feed-forward command ($U_{REC}$) and the predicted RRO ($R_p$) attenuated by the REC convergence gain ($K_{REC}$). The value stored in each sub-circular buffer 502 may be used to determine the REC feed-forward command ($U_{REC}$) in a next revolution. In some implementations, the circular buffer 500 may be a table stored in a processor memory (e.g., local or cache memory) that can be read from and written to by a processor (e.g., by the processing module 122).

Each REC feed-forward command ($U_{REC}$) may be determined from a corresponding servo sector "i" (e.g., 0, 1, 2, 3, 4, 5 and 6) associated with a servo sample "k" (e.g., k, k+1, k+2, k+3, k+4, k+5 and k+6) for a total of six servo samples (N=6). During operation, a position error (PES) at a particular servo sector may be measured. Based on the measured position error (PES), the circular buffer 500 may read and extract a REC feed-forward command ($U_{REC}$) from a corresponding sub-buffer 502 to compensate for the position error (PES).

In some implementations, the REC feed-forward command ($U_{REC}$) may be determined from a previous revolution such that the REC feed-forward command ($U_{REC}$) may converge to an accurate estimate of the source RRO. Subsequently, the REC feed-forward command ($U_{REC}$) may be extracted from a sub-circular buffer, injected into the control loop and summed with the position error (PES) to cancel out the RRO (as will be discussed in greater detail in connection with FIG. 4).

In some implementations, once the REC feed-forward command ($U_{REC}$) is read out, a corrected position error (CPES) may be computed that allows, for example, the servo control module 127 to generate an appropriate DAC command ($U_{DAC}$) for controlling the DAC 125 that drives the VCM 105 so as to realign the read/write head 108 onto a target track. The REC feed-forward command ($U_{REC}$) stored in a corresponding sub-circular buffer may then be updated to be used for the next revolution.

As an example, position error at servo sector "0" (e.g., PES(k)) may be measured. The servo control module 127, detecting the position error (PES(k)) at servo sector "0", reads from the circular buffer 500 and extracts a parameter used to determine the REC feed-forward command ($U_{REC}$) (e.g., which may be determined from a previous revolution) from the sub-circular buffer $CB_0$. Based on the extracted REC feed-forward command ($U_{REC}$), a DAC command ($U_{DAC}(k)$) may be generated and output to compensate for the source RRO associated with the servo sector "0". After compensation is performed, the REC feed-forward command ($U_{REC}$) stored in the sub-circular buffer $CB_0$ may be updated so that the updated buffer parameter may be used for the next revolution.

Next, after servo sector "0" at servo sample "k" has been processed, position error (PES(k+1)) associated with servo sector "1" at servo sample "k+1" may be measured. Similar to that performed with respect to servo sector "0", the servo control module 127, detecting the position error (PES(k+1)) at servo sample "k+1", reads from the circular buffer 500 and extracts a parameter used to determine the REC feed-forward command ($U_{REC}$) from a corresponding sub-circular buffer $CB_1$. Based on the extracted REC feed-forward command ($U_{REC}$), a DAC command ($U_{DAC}(k+1)$) may be generated and output to compensate for the source RRO at servo sample "k+1". After compensation is performed, similar to the circular buffer parameter stored in the sub-circular buffer $CB_0$, the circular buffer parameter stored in the sub-circular buffer $CB_1$ may be updated.

The foregoing process may repeat for all six servo sectors (e.g., servo sector "0", servo sector "1", servo sector "2", servo sector "3", servo sector "4", and servo sector "5"). In some implementations, after the position errors associated with these six servo sectors have been measured and properly compensated, the same process may repeat for a next revolution.

In some implementations, only a fraction of the predicted RRO ($R_p$) may be used to iteratively update the circular buffer 500. This is because if the predicted RRO ($R_p$) contains errors or noise, using its entire value may cause the disk system to become unstable. Thus, in some implementations, only a fraction of the predicted RRO ($R_p$) may be used so as to attenuate the errors or noise to improve system robustness. In these implementations, because only a fraction of the predicted RRO ($R_p$) is used, the circular buffer 500 may be iteratively updated in an least-mean-square manner to improve robustness to plant modeling errors and system noise such that the REC module 300 can accommodate less-than-perfect VCM parameters.

In some cases, although RRO may be defined to be zero mean, due to prediction errors, the predicted RRO ($R_p$) may have a non-zero DC bias. Because the DC level average equation (as will be given below with respect to equation [13]) is integral in nature, buffer parameters in the circular buffer may drift to large values and diverge significantly from the actual RRO. Accordingly, in some implementations, DC bias component may be determined and removed. In these implementations, the average of all "N" values in the circular buffer may indicate a good estimate of the DC bias. Specifically, referring back to FIG. 3, the output of the combiner 318 may be fed to an averaging module 320. The averaging module 320 may be used to calculate a DC level average after each revolution (e.g., mean value of DC level at revolution "m") in order to determine the DC bias component associated with the RRO. More specifically, the averaging module 320 may be used to estimate the DC bias level of the circular buffer. Since the average may be taken over N samples, a new average value of the circular buffer may be calculated by the averaging module 320 once per revolution.

In some implementations, to determine the DC level average, a running sum ($SumCB_m$) of the circular buffer CB for a current revolution "m" may first be determined. The running sum at sample k, in some implementation, may be given by [12]:

$$SumCB_m(k) = \sum_{i=0}^{k\,modulo\,N} CB_i \qquad [12]$$

From the running sum ($SumCB_m$), a DC level average ($DC_m$) for the current revolution "m" then may be computed at the start of every revolution (e.g., when k modulo N=0) by dividing the running sum ($SumCB_m$) by a number of servo sectors "N" for revolution "m", as may be given by [13]:

$$DC_m = \frac{SumCB_m}{N} \qquad [13]$$

Because plant model parameters collected from each revolution may be different, the running sum ($SumCB_m$), in some implementations, may be reset to zero prior to processing a next revolution to ensure accuracy and consistency of the DC level average ($DC_m$) over a range of revolutions.

Since the DC level average ($DC_m$) is computed anew once per rev, there may be significant discontinuities from one revolution to a next revolution. These discontinuities may show up in the REC feed-forward command ($U_{REC}$) and in turn, the head position if not properly compensated. Thus, in some implementations, the DC level average ($DC_m$) may be fed as an input to a filter 322 to smoothen out such discontinuities.

In some implementations, the filter 322 may be a low pass filter. Where a low pass filter is used as the filter 322, the DC bias component of the DC level average ($DC_m$) may be determined, as may be given by [14]:

$$DCF_m(k) = (1-\lambda) \cdot DCF_m(k-1) + \lambda \cdot DC_m \qquad [14]$$

where $\lambda$ is less than 1.

The DC level average ($DC_m$) may be filtered by the filter 322 so as to smooth out any effect caused by the subtraction of the DC level average ($DC_m$) from the REC feed-forward command ($U_{REC}$) at the start of every revolution.

Since $DCF_m$ is the low-pass filtered version of the DC level average ($DC_m$), the high-frequency components of the discontinuities may be filtered out. The level of filtering may be determined by the value of $\lambda$. Generally, a small $\lambda$ may yield a high degree of filtering and a smoother $DCF_m$. With low pass filtering, the mean values of $DCF_m$ and the DC level average ($DC_m$) may substantially be the same.

Subsequently, the REC feed-forward command ($U_{REC}$) may be determined from the circular buffer parameter $CB_i$ (e.g., which may be updated in a previous revolution via feedback line 330) subtracted (e.g., through combiner 328) by the filtered DC level average ($DCF_m$), as may be given by [15]:

$$U_{REC}(k) = CB_i(k-N) - DCF_m(k) \qquad [15]$$

where the circular buffer parameter ($CB_i$) may be given by equation [10] and the filtered DC level average ($DCF_m(k)$) may be given by equation [14].

From equations [8], [10] and [15], it can be seen that each circular buffer entry may be updated based on its value determined one revolution before, subtracted by the circular buffer average from a previous revolution, and combined with the predicted RRO attenuated by a convergence gain ($K_{REC}$).

Figure 4:
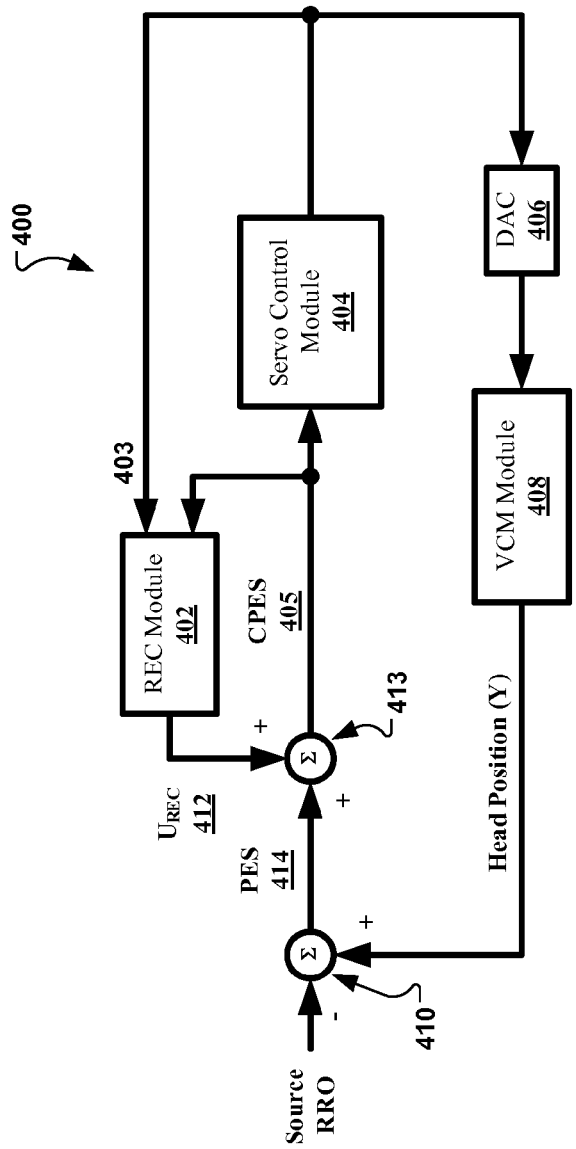
FIG. 4 shows a servo control system that includes a repetitive error correction module similar to the module shown in FIG. 3 that implements a repetitive error correction process using a repetitive error correction feed-forward command ($U_{REC}$).

The REC feed-forward command ($U_{REC}$) may then be used, for example, as a correction factor to correct errors associated with RRO. FIG. 4 shows a servo control system 400 that includes a REC module 402 similar to the module 300 shown in FIG. 3 that implements a REC process using a REC feed-forward command ($U_{REC}$) 403.

As shown in FIG. 4, the REC module 402 may output a REC feed-forward command ($U_{REC}$) 412 to the combiner 413 that combines the REC feed-forward command ($U_{REC}$) 412 with position error (PES) 414. In some implementations, the position error (PES) 414 may be measured based on [16]:

$$PES(k) = Y(k) - RRO(k) \qquad [16]$$

where Y(k) represents a function of the head position with respect to servo control sample "k" and RRO(k) represents the source RRO with respect to servo control sample "k". Both the Y(k) and RRO(k) may not be directly measurable.

In some implementations, the function of the head position Y(k) may be fed back and combined through the combiner 410 with the source RRO to determine a corrected position error (CPES) for a next cycle.

As discussed above, a suitable REC feed-forward command ($U_{REC}$) may be determined through a circular buffer (e.g., circular buffer 500) by subtracting the filtered DC bias ($DCF_m(k)$) from the circular buffer parameter (CB) for revolution "m" (e.g., using equation [15]). The REC feed-forward command ($U_{REC}$) may be integrated with the position error (PES) 414 through the combiner 413 to compute a corrected position error (CPES) 405, as may be given by [17]:

$$CPES(k) = PES(k) + U_{REC}(k) \qquad [17]$$

The corrected position error (CPES) 405 may then be fed to a servo control module 404 so as to generate an appropriate DAC command ($U_{DAC}$) 403 (e.g., through equation [1]). In some implementations, both the corrected position error (CPES) 405 and the DAC command ($U_{DAC}$) 403 may be fed back to the REC module 402 as inputs to aid in determining a corrected position error (CPES) for a next revolution.

The DAC command ($U_{DAC}$) 403 may be sent to the DAC 406 to prepare the DAC command ($U_{DAC}$) 403 for input to the VCM module 408. The DAC 406 may convert a servo controller output command to a voltage input to be fed to the spindle/VCM driver 114.

In some implementations, the DAC command ($U_{DAC}$) 403 may determine the VCM input plant parameter $U_{VCM}(k)$ (e.g., using equation [2]) by determining both the equalization gain ($K_{VCM}$) and the average DC bias component ($AvgDAC_m$) of the DAC command ($U_{DAC}$) 302.

In some implementations, the average DC bias component ($AvgDAC_m$) of the DAC command ($U_{DAC}$) 302 may be obtained by first keeping and maintaining an updated running sum ($SumDAC_m$) for the DAC command ($U_{DAC}$) 302, as may be given by [18]:

$$SumDAC_m(k) = SumDAC_m(k-1) + U_{DAC}(k) \quad [18]$$

From the running sum ($SumDAC_m$), the average DC bias component ($AvgDAC_m$) of the DAC command ($U_{DAC}$) 302 for the current revolution "m" may be computed (e.g., when k modulo N=0) by dividing the running sum ($SumDAC_m$) by a number of servo sectors "N" for revolution "m", as may be given by [19]:

$$AvgDAC_m = \frac{SumDAC_m(k)}{N} \quad [19]$$

Because the VCM plant bias from each revolution may vary, the running sum ($SumDAC_m$) may be reset to zero prior to processing a next revolution to ensure accuracy and consistency of the average DC bias component ($AvgDAC_m$) of the DAC command ($U_{DAC}$) 302 over a range of revolutions. After computing the VCM input plant parameter $U_{VCM}(k)$, the VCM input plant parameter $U_{VCM}(k)$ may be used by the VCM model 312 in conjunction with a VCM plant transfer function $G_{VCM}(z)$ associated with the VCM model 312 to predict the absolute head position $Y_p(k)$ of the read/write head 108 (e.g., using equation [6]).

In some implementations, the read/write head 108 may be operating under a seek operation. In these implementations, the REC process may be halted such that the REC feed-forward command ($U_{REC}$) is fixed, and the fixed REC feed-forward command ($U_{REC}$) sequence may then be output. In some implementations, the REC feed-forward command ($U_{REC}$) may not respond to large seek current swing due to the potential of causing system instability. In these implementations, the REC process may be re-enabled after the seek operation is complete.

Figure 6A:
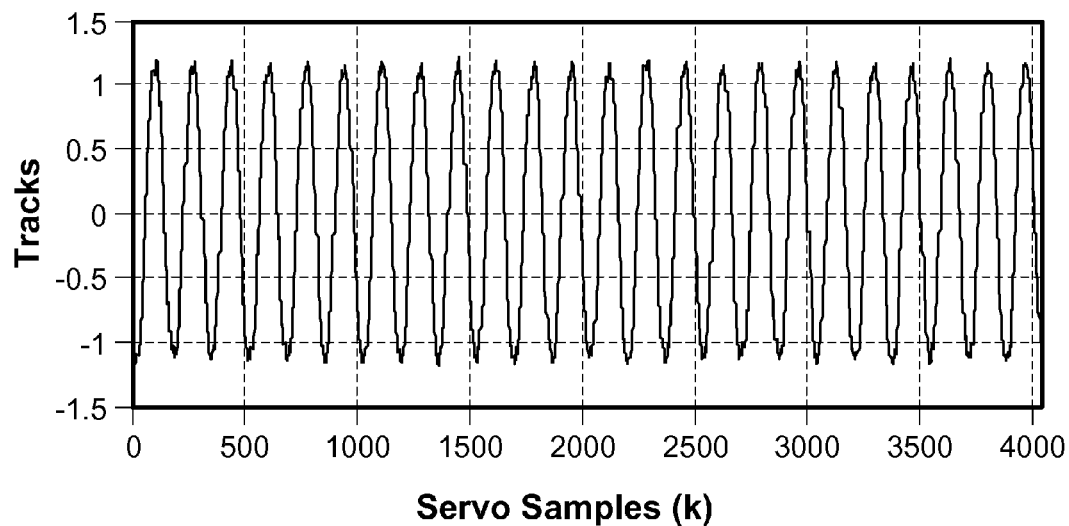
FIG. 6A shows the presence of repeatable run-out before repetitive error correction is enabled.
Figure 6B:
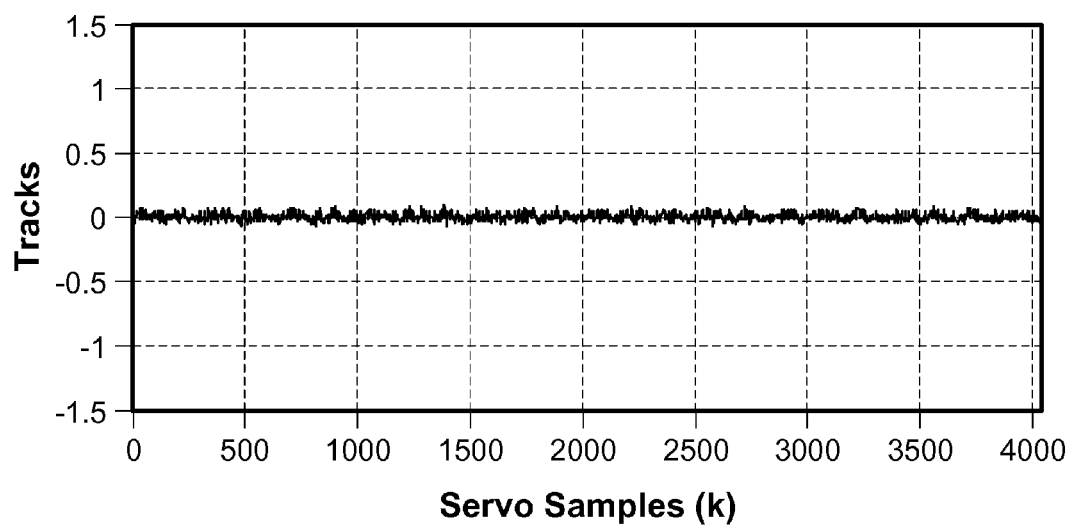
FIG. 6B shows the absence of repeatable run-out after repetitive error correction is enabled.

FIG. 6A shows in a graph 600 the presence of RRO before REC is enabled. As shown in FIG. 6A, before repetitive error correction is enabled, position errors indicate a deviation of +/−1.2 tracks per servo sample. FIG. 6B shows in a graph 650 the absence of RRO after REC is enabled. As shown in FIG. 6B, after repetitive error correction is enabled, position error reduces from about +/−1.25 per servo sample to less than +/−0.1 per servo sample, virtually indicating the absence of RRO.

Figure 7A:
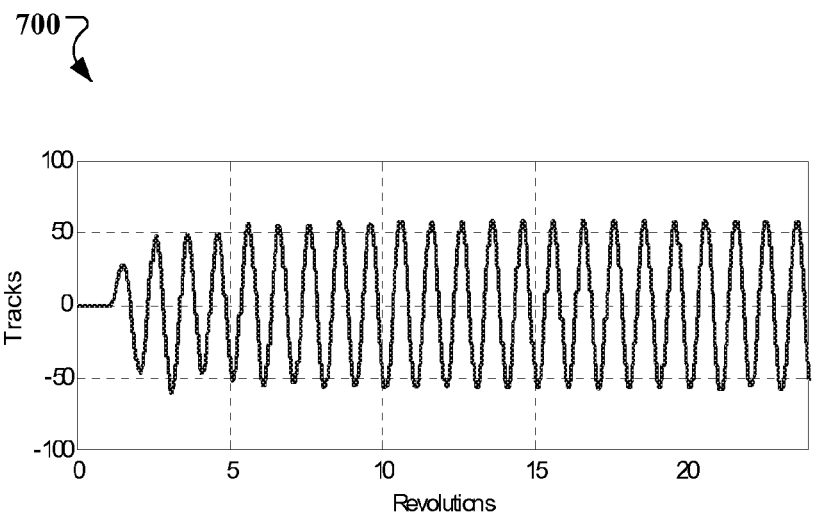
FIG. 7A shows an example of repetitive error correction feed-forward command ($U_{REC}$) response after repetitive error correction is enabled.
Figure 7B:
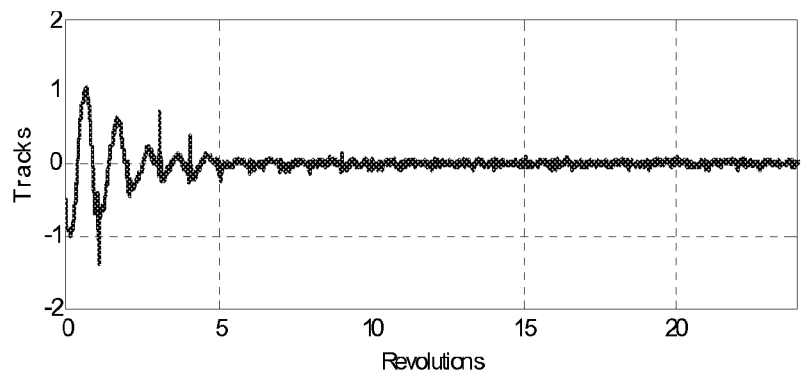
FIG. 7B shows an example of position error response after repetitive error correction is enabled.

FIG. 7A shows in a graph 700 an example REC feed-forward command ($U_{REC}$) after repetitive error correction is enabled. As shown in FIG. 7A, the REC feed-forward command ($U_{REC}$) reaches a steady state within 10 revolutions. In some implementations, convergence time (e.g., the number of revolution) may be tuned by adjusting the REC convergence gain ($K_{REC}$). For example, the REC convergence gain ($K_{REC}$) may be tuned such that the REC feed-forward command ($U_{REC}$) may reach a steady state within less than 10 revolutions. FIG. 7B shows in a graph 750 an example of position error response after repetitive error correction is enabled. As shown in FIG. 7B, position error reaches steady state and virtually becomes zero within 10 revolutions.

Figure 8:
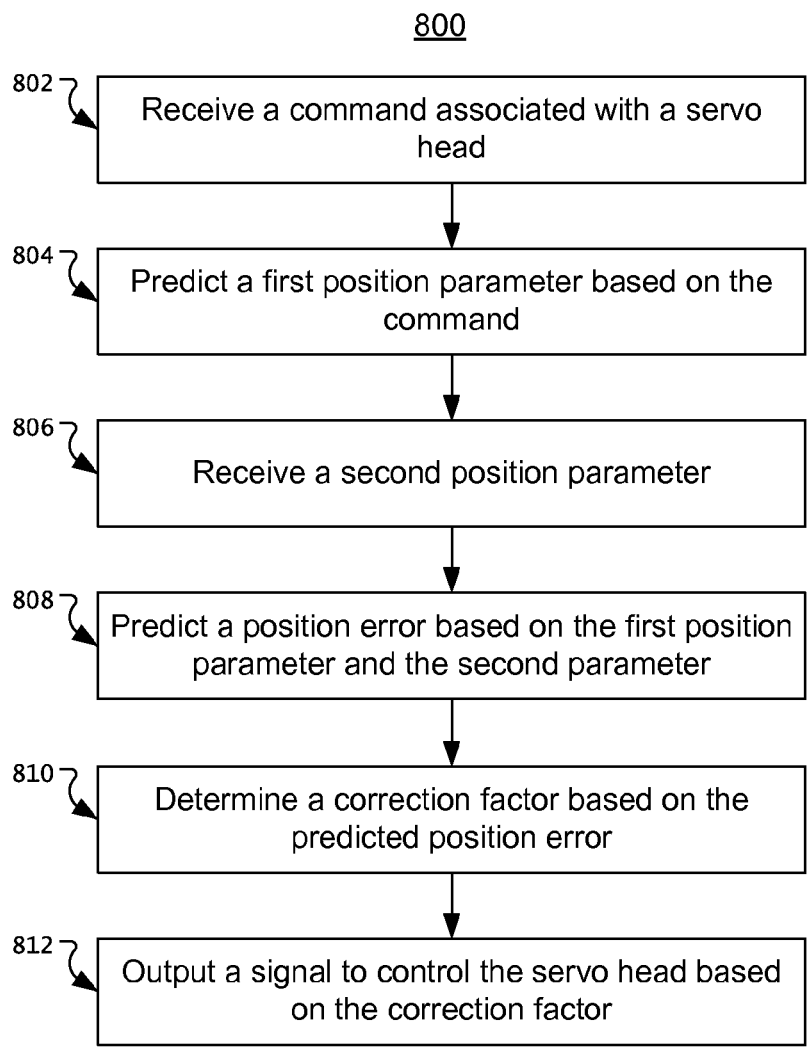
FIG. 8 shows an example process for determining a correction factor for a feed forward command-based repetitive error correction.

FIG. 8 shows an example process 800 for determining a correction factor for the feed forward command-based repetitive error correction. The process 800 may be performed, for example, by the HDD system 100, and for clarity of presentation, the description that follows uses the HDD system 100 as the basis of examples for describing the process 800. However, another system, or combination of systems, may be used to perform the process 800.

Process 800 begins with receiving a command associated with a servo head (802).

Then, a first position parameter may be predicted based on the received command (804). In some implementations, predicting a first position parameter may include constructing a prediction model using one or more position parameters associated with one or more prior revolutions of a recording medium, and applying the prediction model to the received command to predict the first position parameter.

In some implementations, predicting a first position parameter based on the command may include determining an equalization gain, and predicting the first position parameter based on the command and the equalization gain.

In these implementations, determining an equalization gain may include measuring a transfer function gain associated with the command, identifying a ratio between the transfer function gain and the determined equalization gain, and setting the equalization gain based on the identified ratio.

In other implementations, determining an equalization gain may include measuring position errors within a predetermined gain range, identifying a minimum position error from the measured position errors, determining a gain corresponding to the identified minimum position error, and applying the determined gain corresponding to the identified minimum position error as the equalization gain. In these implementations, measuring position errors within a predetermined gain range may include measuring position errors using a statistical process.

A second position parameter also may be received (806). In some implementations, receiving a second parameter may include receiving the second parameter associated with a prior revolution of a recording medium.

In some implementations, predicting a position error based on the first position parameter and the second position parameter may include predicting the repeatable position error based on the first position parameter and the second position parameter, the repeatable position error capable of being repeated over one or more revolutions including the current revolution.

Based on the first position parameter and the second parameter, a position error may be predicted (808).

In some implementations, the predicted position error may be delayed by one or more revolutions. An average position error may then be determined from the predicted position error, where a correction factor also may be determined that may include determining the correction factor based on the average position error and the delayed position error. A gain also may be applied to the predicted position error such that delaying the predicted position error may include delaying the predicted position error having the gain.

Subsequently, a correction factor may be determined based on the predicted position error (810). Using the correction factor, a signal may be output to control the servo head (812). In some implementations, outputting the signal to control the servo head includes controlling a current supplied to the servo head based on the correction factor.

In some implementations, operations 802-812 may be performed in the order listed, in parallel (e.g., by the same or a different process, substantially or otherwise non-serially), or in reverse order to achieve the same result. In other implementations, operations 802-812 may be performed out of the order shown. Also, the order in which the operations are performed may depend, at least in part, on what entity performs the method. Operations 802-812 also may be performed by the same or different entities or systems.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   receiving a command associated with a servo head;
   predicting a first position parameter based on the command;
   receiving a second position parameter;
   predicting a position error based on the first position parameter and the second position parameter;
   determining an average position error from the predicted position error;
   determining a correction factor based on a delay version of the predicted position error;
   and
   outputting a signal to control the servo head based on the correction factor,
   where determining a correction factor includes determining the correction factor based on the average position error and the delayed predicted position error.

2. The method of claim 1, where outputting the signal to control the servo head includes controlling a current supplied to the servo head based on the correction factor.

3. The method of claim 1, where predicting a first position parameter includes:
   constructing a prediction model using one or more position parameters associated with one or more prior revolutions of a recording medium; and
   applying the prediction model to the received command to predict the first position parameter.

4. The method of claim 1, where receiving a second parameter includes receiving the second parameter associated with a prior revolution of a recording medium.

5. The method of claim 1, further comprising:
   applying a gain to the predicted position error,
   where delaying the predicted position error includes delaying the predicted position error having the gain.

6. The method of claim 1, further comprising:
   writing the correction factor into a circular buffer, the circular buffer including one or more correction factors determined in one or more prior revolutions of a recording medium.

7. The method of claim 1, where predicting a position error based on the first position parameter and the second position parameter includes predicting a repeatable position error based on the first position parameter and the second position parameter, the repeatable position error capable of being repeated over one or more revolutions including a current revolution.

8. The method of claim 1, where predicting a first position parameter based on the command includes:
   determining an equalization gain; and
   predicting the first position parameter based on the command and the equalization gain.

9. The method of claim 8, where determining an equalization gain includes:
   measuring a transfer function gain associated with the command;
   identifying a ratio between the transfer function gain and a gain value corresponding to one or more parameters that model the position error; and
   setting the equalization gain based on the identified ratio.

10. The method of claim 8, where determining an equalization gain includes:
    measuring position errors within a predetermined gain range;

identifying a minimum position error from the measured position errors;
determining a gain corresponding to the identified minimum position error; and
applying the determined gain corresponding to the identified minimum position error as the equalization gain.

11. The method of claim 10, where measuring position errors within a predetermined gain range includes measuring position errors using a statistical process.

12. The method of claim 1, further comprising delaying the predicted position error by one or more revolutions to generate the delay version of the predicted position error.

13. A method comprising:
receiving one or more parameters for driving a servo head;
constructing a model function based on the received parameters;
predicting a position error using the model function;
generating a correction factor from the predicted position error including:
constructing a circular buffer table including one or more correction values determined from prior revolutions of a recording medium, and
generating the correction factor based on the predicted position error and one or more correction values to cancel out position errors associated with the servo head in a current revolution of the recording medium; and
compensating the servo head based on the correction factor.

14. The method of claim 13, where compensating the servo head based on the correction factor includes:
determining a corrected position error based on the correction factor and a head position error associated with the servo head; and
compensating the servo head based on the corrected position error.

15. The method of claim 13, where receiving one or more parameters for driving a servo head includes receiving a command from a previous revolution associated with the servo head for controlling one or more performance parameters of the servo head.

16. The method of claim 13, further comprising:
storing the correction factor generated in the current revolution in the circular buffer table.

17. An apparatus comprising:
a correction module to generate a correction signal that compensates position errors of a servo head;
a servo controller to output a control signal based on the compensated position errors;
a delay operator to delay the control signal to provide a delayed control signal; and
a voice coil module to control the servo head to follow a target servo track in response to the delayed control signal,
where the correction module includes an averaging module to generate an average value associated with the control signal.

18. The apparatus of claim 17, wherein the correction module generates a correction signal for a current revolution of a computer readable medium based on compensated position errors and the delayed control signal associated with a previous revolution of the computer readable medium.

19. The apparatus of claim 17, wherein the voice coil module controls the servo head in response to the compensated position errors, the delayed control signal and the average value.

20. The apparatus of claim 17, wherein the delay operator delays the control signal by one revolution.

21. The apparatus of claim 17, further comprising:
a low pass filter to remove DC bias components associated with the average value.

22. The apparatus of claim 17, further comprising:
a gain module to apply a gain to the control signal prior to delaying the control signal and generating the average value of the control signal.

23. A system comprising:
a head-disk assembly including one or more platters and a servo head;
a host operatively coupled with the head-disk assembly;
a correction module to generate a correction signal that compensates position errors of the servo head;
a servo controller to output a control signal based on the compensated position errors;
a delay operator to delay the control signal to provide a delayed control signal; and
a voice coil module to control the servo head to follow a target servo track in response to the delayed control signal,
where the correction module includes an averaging module to generate an average value associated with the control signal.

24. The system of claim 23, wherein the correction module generates a correction signal for a current revolution of a computer readable medium based on compensated position errors and the delayed control signal associated with a previous revolution of the computer readable medium.

25. The system of claim 23, wherein the voice coil module controls the servo head in response to the compensated position errors, the delayed control signal and the average value.

26. The system of claim 23, wherein the delay operator delays the control signal by one revolution.

27. The system of claim 23, further comprising:
a low pass filter to remove DC bias components associated with the average value.

28. The system of claim 23, further comprising:
a gain module to apply a gain to the control signal prior to delaying the control signal and generating the average value of the control signal.

* * * * *